CONVERTING DEVICES

Filed Aug. 15, 1957 6 Sheets-Sheet 1

GENE MYRON AMDAHL
WILLIAM ENSIGN FRADY
INVENTORS

BY ELWOOD S. KENDRICK
Lester S. Hecht
Morris Spector
ATTORNEYS

GENE MYRON AMDAHL
WILLIAM ENSIGN FRADY
INVENTORS

BY ELWOOD S. KENDRICK
ATTORNEYS

GENE MYRON AMDAHL
WILLIAM ENSIGN FRADY
INVENTORS

ELWOOD S. KENDRICK
BY Lester S. Schelt
Morris Spector
ATTORNEYS

CONVERTING DEVICES

Filed Aug. 15, 1957 6 Sheets-Sheet 4

GENE MYRON AMDAHL
WILLIAM ENSIGN FRADY
INVENTORS

BY ELWOOD S. KENDRICK
Lester S. Hecht
Morris Spector
ATTORNEYS

CONVERTING DEVICES

GENE MYRON AMDAHL
WILLIAM ENSIGN FRADY
INVENTORS

BY ELWOOD S. KENDRICK
[signature]
[signature]
ATTORNEYS

GENE MYRON AMDAHL
WILLIAM ENSIGN FRADY
INVENTORS

BY ELWOOD S. KENDRICK
Lester S. Hecht
Morris Spector
ATTORNEYS 3,049,701
Patented Aug. 14, 1962

3,049,701

CONVERTING DEVICES

Gene Myron Amdahl, Canoga Park, and William Ensign Frady, Palos Verdes Estates, Calif., assignors, by mesne assignments, to Thompson Ramo Wooldridge Inc., Cleveland, Ohio, a corporation of Ohio Filed Aug. 15, 1957, Ser. No. 678,357
9 Claims. (Cl. 340—347)

This invention relates to converting devices and, more particularly, to circuits for performing conversions between analogue and digital signals. In further particular, the invention provides various arrangements for cyclically translating a series of digital signals, which may represent a binary number, to an analogue output signal representing the series of digital signals; or for translating an analogue input signal into a series of output digit signals representing the amplitude thereof.

A plurality of input (analogue-to-digital) and output (digital-to-analogue) conversion schemes have been devised in the prior art. A general summary of this art, with particular reference to analogue-to-digital converters, is found in an article entitled "Analogue Measurement and Conversion to Digits" by Taylor C. Fletcher, published in the Instrument Society of America Journal of September 1955, pages 341 to 344.

In the early development of the converting art, serial conversion for operating upon successive digits over a period of time was performed by generating a varying standard signal and performing successive operations upon the standard signal to generate an analogue output signal or to perform comparisons to generate digital output signals. Thus, in one of the early analogue-to-digital converter systems wherein the output digits were formulated into a serial binary code, a descending standard signal decreasing by a power of two was generated. This type of operation may be illustrated by considering a typical example where the analogue input sample has an amplitude of 13 and four binary digits are to be generated. In this case, the prior art system would have produced a descending standard signal having successive values of 8, 4, 2, and 1. The operation of the system may be illustrated by the following example:

| | Analogue Input Signal — Varing Standard Signal | | Output Digits |
|---|---|---|---|
| (1) | $13-8=$ | $5>0$ | 1 |
| (2) | $5-4=$ | $1>0$ | 1 |
| (3) | $1-2=$ | $-1<0$ | 0 |
| (4) | $1-1=$ | $0=0$ | 1 |

In this example, it will be noted that the successive levels of the standard signal are subtracted from the remainder of the previous subtraction. After each subtraction, the resulting signal is compared to a reference, such as ground, to determine whether or not the output digit should be a binary one or zero. It will be noted that the first subtraction results in a difference of five which is greater than zero, and an output digit of one is generated. The difference signal is then reduced by the next standard signal of value four, resulting in a new difference of one which again is greater than zero and results in an output digit equal to one. In the third operation a standard signal of two is subtracted from the previous difference of one and the result is negative and less than zero so that the output digit is zero. In this case, the standard signal value of two is restored and, in the final cycle, a standard cycle of one is subtracted from the remaining difference of one, resulting in zero, so that the final output digit is one. Thus, the binary code 1 1 0 1 is generated, representing an analogue amplitude of 13.

A similar operation may be performed for converting digital signals to an analogue output signal. The manner in which this has been done is conveniently illustrated by the next example, where binary input signals 1, 1, 0, and 1, applied in that order, represent the number 13.

| | $Aj\text{–}1+D.\,Est=Aj$ | |
|---|---|---|
| (1) | $0+1.8$ | $=8$ |
| (2) | $8+1.4$ | $=12$ |
| (3) | $12+0.2$ | $=12$ |
| (4) | $12+1.1$ | $=13$ |

It will be noted in the above example that the successive values of the analogue output signal as it is generated are designated as $Aj$, and that it is then combined with the digit product $D.Est$, where D represents the successive binary signals and $Est$ the varying standard signal. In this case, the previously formed analogue signal is represented as $Aj\text{–}1$. In the accumulation process illustrated by this example, each standard signal is accumulated to the previous analogue level, represented by $Aj\text{–}1$, whenever the binary input digit is one. This type of conversion has also been performed where the input digits are applied in the order of increasing significance so that the binary number 13 appears as: 1 0 1 1. This operation is illustrated as follows:

| | $Aj\text{–}1+D.\,Est=Aj$ | |
|---|---|---|
| (1) | $0+1.1$ | $=1$ |
| (2) | $1+0.2$ | $=1$ |
| (3) | $1+1.4$ | $=5$ |
| (4) | $5+1.8$ | $=13$ |

Several arrangements have been found in the prior art for generating the varying standard signal required for the above-outlined conversion techniques. The most accurate of these arrangements is found in the employment of a switching network where a plurality of impedance values are selected, each to represent a particular weight for the standard signal stepping process. In binary conversion systems of this type, a series of resistors may be employed, each resistor providing an output voltage or current, controlled by an associated switch, and having a value which differs from the value of the resistor in the adjacent position by a factor of two. Typical switching networks which have been employed in the prior art are found in the following patents:

No. 2,437,707 by J. R. Pierce
No. 2,451,044 by J. R. Pierce
No. 2,538,266 by J. R. Pierce
No. 2,636,159 by R. L. Carbrey
No. 2,610,295 by R. L. Carbrey
No. 2,721,318 by R. H. Barker Other methods for generating a varying standard signal have been employed which are less accurate. In digital-to-analogue conversion, for example, an effective varying signal is achieved by attenuating successively applied digital signals in an exponential network. In this manner, a digital-to-analogue conversion may be performed in the order of digits of increasing significance since the first applied digit is exponentially reduced in amplitude during the operation until it is of a suitable digital amplitude. The later applied digital pulses, then, are attenuated by smaller factors until the last applied digit is received without attenuation and represents the most significant digit. This type of conversion system is found in the patent to Rack, No. 2,514,671.

In view of the complexity of the conversion systems requiring a switching network for generating the varying standard signals, several alternate schemes have been proposed. These schemes have been based upon a possibility of successively increasing analogue signals, as they are formed, by the radix of conversion. The general approach involved can best be described by way of an illustration as follows:

| | $Aj{-}1-D.\,Est=Aj$ | $Aj{-}1$ | $Ref$ | $D$ |
|---|---|---|---|---|
| (1) | 2(13 − 1.8) = 10 | 13>8 | | 1 |
| (2) | 2(10 − 1.8) = 4 | 10>8 | | 1 |
| (3) | 2(4 − 0.8) = 8 | 4 <8 | | 0 |
| (4) | 2(8 − 1.8) = 0 | 8 = 8 | | 1 |

The notation employed here is the same as that introduced above with the addition of the designation *Ref* to represent a reference signal for comparison. It should also be noted that the output digits are designated as D and correspond to the signals utilized to control the subtraction of the standard signal.

In this operation, an analogue sample of 13 is compared to a reference signal having a weight of 8 and, since it is greater, a standard signal E*st* is subtracted to produce a difference signal which is then multiplied by two (where a binary digit conversion is to be performed), resulting in an analogue difference signal having a weight of 10.

The first comparison indicating 13 to be greater than 8 results in the first output digit of binary one. After this, successive cycles are employed to perform similar comparisons and subtractions, output digits $D=1$ being generated whenever signal $Aj{-}1 \geqq Ref$ and digits $D=0$ being generated whenever signal $Aj{-}1<Ref$.

While the possibility of this conversion approach has been recognized, the proposed systems have had many practical limitations. One of these proposed systems is discussed in the above-mentioned article by Taylor C. Fletcher, particular reference being made to page 344 thereof and to FIG. 8. As is pointed out by Mr. Fletcher, the system requires the use of a delay circuit and is dependent upon the accurate synchronization of various pulse inputs in order to cyclically reapply various differences signals as they are formed. Thus the author recognizes that "the difficulty in this system is the problem of obtaining an accurate time delay." Furthermore, the author notes that the accuracy of the system is doubtful in view of the limitation of the gate required and then proceeds to point out that slow operating relays would be required for accuracy.

This type of cycling pulse operation to perform conversions has also been contemplated for digital-to-analogue circuits as is illustrated in the patent to Carbrey No. 2,579,302. The Carbrey patent indicates several other difficulties inherent in the known prior art serial techniques in that the feedback loop required for successively multiplying the analogue signals by two is unstable. Carbrey attempts to avoid this difficulty by alternately utilizing first and second feedback amplifiers designated in FIG. 1 of the patent as 10 and 16, by means of a mechanical distributor. The Carbrey patent also shows the employment of an attenuating delay line whereby digital-to-analogue conversion may be performed in the order of least significant digits first as discussed above.

At the present stage of the serial converting art, therefore, no reliable system has been devised which is sufficiently accurate without employing fairly complicated networks, such as the switching networks described above for generating a varying standard signal.

Accordingly, it is a general object of the present invention to provide a reliable serial conversion system which does not require a complex switching network to produce a varying standard signal.

Another general object of the invention is to obviate the necessity of employing pulse gating and delay devices in order to provide a conversion system which does not require the generating of a varying standard signal.

These general objects are accomplished, in accordance with the basic concept of the invention, through the employment of a serial conversion system which is made to operate upon D.-C. signals, so that no pulse coincidence problem can exist and no pulse delay devices are required. As each D-C. signal A*j* is formed, it is entered for storage into one of two storage elements, such as capacitors, while the previously formed signal A*j*–1 is read from the other storage element and applied to the combining and amplifying means to complete the information necessary to form signal A*j*.

In accordance with a more specific aspect of the invention, serial conversion is performed by cyclically producing successive analogue signals defined as follows:

$$Aj=R.Aj{-}1+D.Est$$

where A*j*–1 represents a previously formed analogue signal, R represents a predetermined radix of conversion which may be equal to +2 for binary numbers, D represents a particular digit operated upon or performed, and E*st* is a fixed standard signal.

The product *D.Est* is produced by gating means having inputs D and E*st*. The input D will be a serial input if a digital-to-analogue conversion is made. D will be produced by a feedback output and comparison means when an analogue-to-digital conversion is to be made. R is multiplied by A*j*–1 and the sum of *R.Aj*–1 and *D.Est* is conveniently performed in a novel combining and amplifying circuit. The storage of signal A*j* is performed alternately by two storage elements, S1 and S2. In the serial operation of the invention, the output of element S1 is impressed upon the combining and amplifying means and signal A*j*, produced during a first phase or cycle, is transferred to element S2. After this first phase or cycle, a second phase or cycle is employed for transferring signal A*j* from element S2 to element S1. The distinction between a phase and a cycle is developed below.

Provision may be made, in accordance with the invention, for operating two storage devices referred to hereafter as S1 and S2 either in series or in parallel.

In the parallel operation of elements S1 and S2, signal A*j* is alternately entered into elements S1 and S2 durduring successive phases or cycles. Thus, when the previously generated signal A*j*–1 is in element S1, the output signal produced by the combining and amplifying means is transferred to element S2, whereas during the next phase or cycle the previously generated signal A*j* becomes signal A*j*–1 and S2 is coupled to the combining circuit while the new analogue signal A*j* is transferred to element S1.

These basic approaches to serial conversion obviate the necessity of any pulse delay since each storage element retains a constant signal which does not vary during the time the other storage element is receiving its new information. Furthermore, the transfer of the analogue signals from storage in one element to another may be accurately synchronized by employing electronic gating circuits which may be turned on at precisely accurate time intervals.

An additional object of the invention, therefore, is to provide an improved serial of conversion device wherein two storage elements are employed to allow the accurate cycling of analogue information without the necessity of pulse delay means.

A further object of the invention, thus, is to provide improved sequencing techniques for a serial converter wherein first and second storage devices are alternately employed to store an analogue signal A*j*.

Still a further object of the invention is to provide a sequencing technique for serial conversion whereby only a single inverting feedback amplifier is required to perform the necessary conversion.

Still another object of the invention, therefore, is to provide improvements in serial conversion systems wherein the radix of the digits to be operated upon may be greater than two.

The novel features which are believed to be characteristic of the invention, both as to its organization and method of operation, together with further objects and advanages thereof, will be better understood from the following description considered in connection with the accompanying drawings, in which several embodiments of the invention are illustrated by way of example. It is to be expressly understood, however, that the drawings are for the purpose of illustration and description only, and are not intended as a definition of the limits of the invention.

Figure 1:
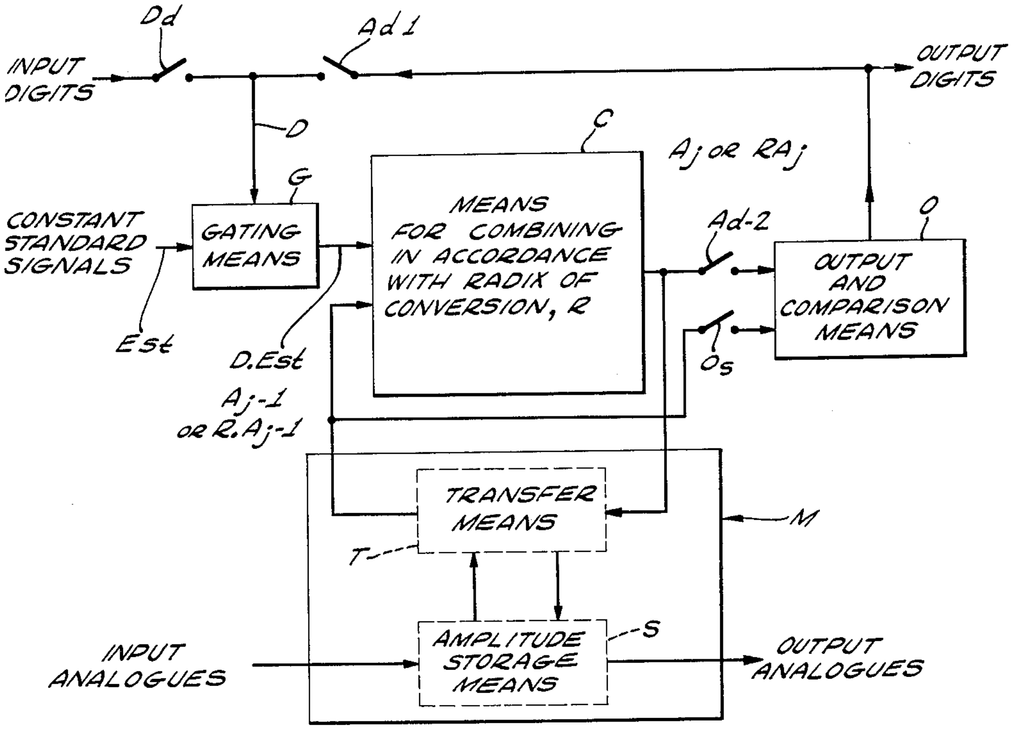
FIG. 1 is a block diagram of a converting device of the invention adapted to perform both analogue-to-digital and digital-to-analogue conversions.

In the drawings in FIG. 1, a general block diagram is shown including gating means G for combining input signals *D.Est* and A*j*–1 or *R.Aj*–1 in accordance with a radix of conversion R; output and comparison means O; and transfer and storage means M. These means are connected in a manner such that by closing selected ones of certain switches, serial output digits may be obtained from input analogues, or alternatively, output analogues may be derived from input digits. Input digits D or digits D developed by output and comparison means O are applied to gating means G selectively through switches D*d* and A*d*1. Gating means G are employed to pass constant standard signals E*st* in accordance with whether $D=1$ or $D=0$ in binary arithmetic. Signal *D.Est* produced by gating means G may be referred to hereinafter as a "logical product" or an "and" function. By this it is meant that the output signal value is equal to the product of digit signal D and standard signal E*st*, so that when $D=0$ the product is a zero signal, and when $D=1$ the product is equal to E*st*. Combining means C then performs one of the following two computations:

$$Aj=R.Aj-1+D.Est \qquad (1)$$

$$R.Aj=R(R.Aj-1+D.Est) \qquad (2)$$

A two-phase sequence for performing an analogue-to-digital conversion according to Equation 1 is illustrated as follows:

| | | | | | | | |
|---|---|---|---|---|---|---|---|
| (1) | | *Aj*-1 | | | *R.Aj*-1 + *Dt.Est* | *Ref* | *D* |
| | (*a*). | 13 | to | *S*2 | | | |
| | (*b*). | −1.13 | to | *S*1 | −2.(−13) + 1.(−16) > | 0 | 1 |
| (2) | | *R.Aj*-1 + *D.Est* | | *S*2 | *R.Aj*-1 + *Dt.Est* | *Ref* | |
| | (*a*). | 2.13 + 1.(−16) | = | 10 | | | |
| | (*b*). | −1.10 | to | *S*1 | −2(−10) + 1.(−16) > | 0 | 1 |
| (3) | | *R.Aj*-1 + *D.Est* | | *S*2 | *R.Aj*-1 + *Dt.Est* | *Ref* | |
| | (*a*). | 2.10 + 1.(−16) | = | 4 | | | |
| | (*b*). | −1.4 | to | *S*1 | −2.(−4) + 1.(−16) < | 0 | 0 |
| (4) | | *R.Aj*-1 + *D.Est* | | *S*2 | *R.Aj*-1 + *Dt.Est* | *Ref* | |
| | (*a*). | 2.4 + 0.(−16) | = | 8 | | | |
| | (*b*). | −1.8 | to | *S*1 | (−2)(−8) + 1.(−16) = | 0 | 1 |

In the above two-phase sequence, the first phase in each cycle is employed to transfer the previously formed analogue signal A*j* to storge element S2. At the start, the analogue input signal may either be entered directly into element S2 as a first phase of operation, or into S1 as a second phase of operation which involves the inverting transfer of the signals stored in element S2 to element S1.

A comparison is performed during each second phase by assuming the output digit to be a binary one and then forming the combination of the standard signal E*st* with this assumed digit, designated as D*t*, while performing a comparison with a reference signal of zero. Thus, in the second phase (*b*) of the first cycle (1), while the analogue input signal is being transferred with inversion to element S1, the test digit product *Dt.Est* is formed and a corresponding trial analogue output signal $$R.Aj-1+Dt.Est$$

is compared to zero as a reference, and being greater than zero, a true output digit, $D=1$, is generated.

During the second cycle, then, the result of the previous test performed in the first cycle is utilized to generate a true analogue signal A*j* which is entered, during the first phase thereof, into storage element S2. The sequence then continues in this manner with each second phase being employed to allow the transfer from storage element S2 and S1 with inversion, while performing a test comparison in utilizing test digit $Dt=1$.

It will be noted that digit D employed in the fourth cycle is zero whereas the test digit D*t* tried in the second phase of the third cycle was assumed to be one. This occurs in view of the results of the comparison where the trial analogue signal is less than the zero reference signal.

A similar sequence may be performed with the assumption that the test digit D*t* is equal to zero, in which case the reference signal for comparison becomes +16.

While the multiple-phase sequences naturally result in slower operating systems, there are several possible advantages. In the first place the load placed upon the storage elements S1 and S2 may be reduced in such systems by the interposition of amplifiers. In addition, it will be seen that it is not necessary to load the storage elements in performing the comparison operation, as is the case in one form of higher speed system, since the additional phase allows utilization of an amplifier output signal rather than a stored signal. Finally, it will be shown that the multiple-phase technique allows a simplification in the converting means of the invention whereby a single inverting amplifier may be employed during successive phases without changing either the standard signal or the reference signal.

Where speed is important, a single-phase cycle sequencing technique of the invention may be preferred. According to this technique, the means employed to produce signal $Aj$ is modified to also multiply signal $Aj$ by the radix conversion R to produce an output signal $R.Aj$. This may be defined in accordance with the general formula of Equation 2.

In sequencing analogue-to-digital conversion, according to this general formula, the analogue input signal A1 is first multiplied by the radix of conversion and then entered into one of the storage elements. During successive cycles, then, each previously formed signal $R.Aj\text{–}1$ is combined with the standard signal $Est$ and multiplied by the radix of conversion R to form the new output signal $R.Aj$. This high-speed serial conversion technique may best be illustrated by a particular example:

| | | | | Ref | D |
|---|---|---|---|---|---|
| (1) | $R.Aj\text{–}1$ 2.13 | = | $S1$: 2.13 | > 16 | 1 |
| (2) | $R.(R.Aj\text{–}1 + D.Est)$ 2. [2.13 + 1.(−16)] | = | $S2$: 2.10 | > 16 | 1 |
| (3) | 2. [2.10 + 1.(−16)] | = | $S1$: 2.4 | < 16 | 0 |
| (4) | 2. [2.4 + 0.(−16)] | = | 2.8 | = 16 | 1 |

It will be noted in this example that the analogue input signal of weight 13 is multiplied by 2 for a binary conversion and entered into storage element S1. At the same time, the product 2.13 is compared to $Ref=16$ and being greater an output digit $D=1$ is produced. This output digit is then employed during the next cycle to control the combination of a standard signal $Est=-16$. At this time the previously computed product 2.13, which was stored in element S1, is applied to the combining means and the output signal generated is two times the combination 2.13+1.(−16), which is then transferred to storage element S2. While the transfer is made to storage element S2, a second comparison, 2.10>16, is made and again a digit $D=1$ is generated. The third cycle is performed in a similar manner and differs only in that the signal generated, 2.4, is less than the reference signal 16 so that the output digit $D=0$; and the fourth cycle then is shown as including 0.(−16) as the digit product $D.Est$.

This high-speed serial conversion method may also be performed with storage elements S1 and S2 coupled in series. In this case, instead of multiplying by +2, the conversion circuit may be simplified by successively multiplying by −2 and changing the sign of the combination from plus (+) to minus (−) during the successive cycles. This type of sequencing is illustrated in the following example:

| | | | | Ref | D |
|---|---|---|---|---|---|
| (1) | $R.Aj\text{–}1$ − 2.13 | = | $S1$: −2.13 | < −16 | 1 |
| (2) | $R.(R.Aj\text{–}1 + D.Est)$ − 2.[−2.13 − 1.(−16)] | = | $S2$: −2.(−10) | > +16 | 1 |
| (3) | − 2.[−2.(−10)+ 1.(−16)] | = | $S1$: −2.4 | > −16 | 0 |
| (4) | − 2.[−2.4 − 0.(−16)] | = | $S1$: −2.(−8) | = +16 | 1 |

It will be noted in this example that the analogue input signal 13 is multiplied by −2 and that a comparison to a reference of −16 is made resulting in an output digit $D=1$. In the next cycle, the standard signal and digit $D.Est$ are combined by subtraction in order to account for the inversion which results from the previous multiplication by −2. The output signal produced during the second cycle, however, has a positive sign so that the next reference for comparison is +16. Another inversion results from the next cycle so that the standard signal and its product $D.Est$ is combined by addition, and the comparison reference becomes −16. The sequencing from element S1 to S2 and from element S2 to S1 is similar to that employed in the previous exmple and the comparison technique is the same except for the change in sign of the reference signal.

As stated previously, computation in accordance with Equation 1 is made where the operation desired is the slower or two-phase mode of operation and according to Equation 2 when operation according to the faster or single-phase mode is desired. The output signal of means C in FIG. 1 is either $R.Aj$ or simply $Aj$ depending upon in which mode the converter is operating. The output signal $Aj$ or $R.Aj$ is then impressed on transfer and storage means M and selectively on output and comparison means O through switch $Ad2$ when an analogue-to-digital conversion is to be made. The output of transfer and storage means M, i.e. $Aj\text{–}1$ or $R.Aj\text{–}1$, is then impressed on combining means C and selectively on output and comparison means O through a switch $Os$. Switch $Os$ is closed when no digit storage is provided in output and comparison means O for fast computation. The use of such storage in means O includes an alternative embodiment of the invention that will be explained in detail hereinafter where computation is made according to Equation 2.

Still referring to FIGURE 1, for digital-to-analogue conversion, neither of the switches $Ad2$ or $Os$ are closed and the use of output and comparison means O is unnecessary. Furthermore, the switch $Ad1$ is not closed. Only the switch $Da$ is closed. In this case, of course, no input analogues are supplied to transfer storage means M. Only output analogues are derived from an amplitude storage means S included in transfer and storage means M. Means M also includes a transfer means T connected from the output of means C to its input.

For the operation of the invention shown in FIG. 1 as an analogue-to-digital converter, no output analogues are provided at the output of amplitude storage means S but only input analogues are supplied to it. In addition, switch $Da$ is opened and switches $Ad1$ and $Ad2$ are closed. Switch $Os$ may or may not be closed, depending upon the species of the invention employed in output and comparison means O. Transfer means T transfers output signal $Aj$ to one of two storage devices in amplitude storage means S selectively. Transfer means T also takes selected outputs from stored or $Aj\text{–}1$ signals in amplitude storage means S and applies them to combining means C. Signals $Aj$ or $R.Aj$ are stored and subsequently may be defined as $Aj\text{–}1$ or $R.Aj\text{–}1$ signals, depending upon the embodiment of the invention used. It is, in fact, an outstanding advantage of the invention that storage means S is used rather than simply delay means as shown in the previously mentioned Fletcher article. This for the reason that delay means can make the feedback loop unstable whereas storage means by definition with transfer means T prevent entirely any instantaneous feedback, transfer means T being a switch or gate operated to prevent any instantaneous feedback from the output of means C through storage means S to the input of means C.

The invention will be better understood when considered in connection with several species of storage means S and transfer means T taken in connection with specific embodiments of the invention shown in subsequent figures of the drawings.

Figure 2:
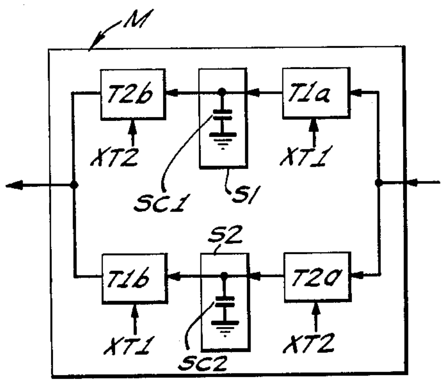
FIGS. 2 and 3 are schematic diagrams of specific embodiments of transfer and storage means shown generally as a block in FIG. 1.
Figure 3:
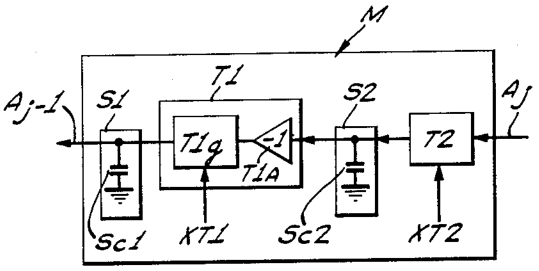

Two embodiments of transfer and storage means M are shown in FIGS. 2 and 3. In FIG. 2 a parallel arrangement of capacitors $Sc1$ and $Sc2$ in storage devices S1 and S2 are shown to store analogue output signals $Aj$ or $R.Aj$ from means C. The output signals $Aj$ or $R.Aj$ are selectively gated to the storage devices S1 and S2. This is accomplished through gates $T1a$ and $T2a$ having gating input signals XT1 and XT2. The outputs of storage devices S1 and S2 are then selectively impressed upon means C through gates $T2b$ and $T1b$ these gates also being provided with gating input signals XT2 and XT1, respectively. Capacitors Sc may, of course, be replaced with any convenient electromagnetic or electromechanical storage device although capacitor storage is preferred for speed. In a few instances delay devices may be employed.

The embodiment of means M shown in FIG. 3 includes a series connection of storage devices S1 and S2 including capacitors Sc1 and Sc2. It is to be noted that capacitor Sc2 is simply preceded by a transfer means or gate T2 responsive to an input signal A*j* and a gating signal XT2. The output of gate T2 is impressed on storage device S2 and amplifier T1A multiplies its input signal from storage device S2 by $-1$ as indicated in transfer means T1. The output of amplifier T1A is impressed upon a gate T1*g* which is supplied with an input gating signal XT1. The output of gate T1*g*, A*j*–1, is impressed upon both storage device S1 and combining means C simultaneously.

The operation of both the parallel and series connected storage devices S1 and S2 will be better understood in connection with complete embodiments of the invention. For example, in FIG. 4, an embodiment of the invention is shown for use as an analogue-to-digital converter including the arrangement for means M shown in FIG. 3 with serial connections of storage devices S1 and S2 having transfer means T1 and T2 connected immediately previous to each of the storage devices S1 and S2. The storage device S2 is then connected at the input to transfer means T1. The analogue input signal is gated in by a gating signal X*m* through a gate M*g*. The output of gate M*g* may be impressed either on the combining means C directly or through storage device S1 since storage device S1 simply is a parallel-connected capacitor Sc1 as shown in FIG. 3.

Figure 4:
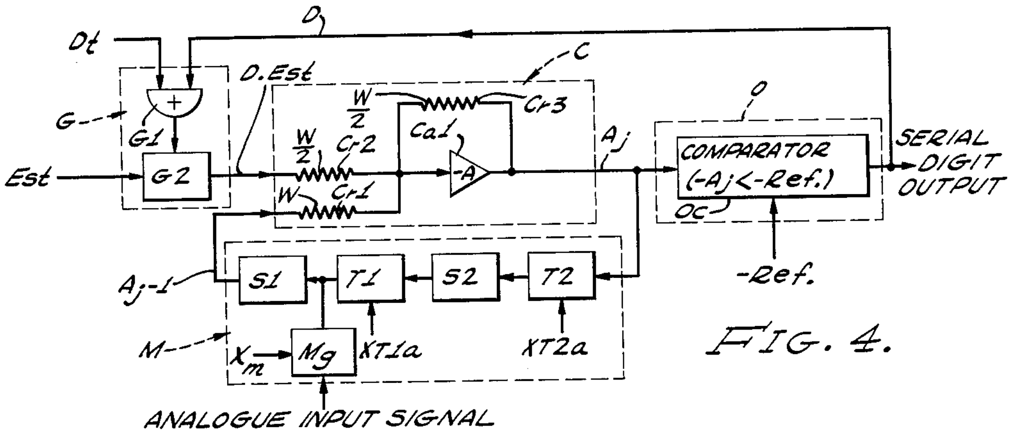
FIG. 4 is a schematic diagram of an embodiment of the invention having a two-phase mode of operation.

Gating means G in FIG. 4 comprises a logical "or" gate G1 for impressing an output signal $Dt+D$ on a standard signal gate G2, the output of which is either E*st* or zero, $D+Dt$ always being equal to 1 or 0. D*t* is a switching function which may be called a trial digit. D is simply a serial digit output of output and comparison means O. Means O may include simply a comparator O*c* as shown in FIG. 4.

Combining means C in FIG. 4 includes a pair of input resistors C*r*1 and C*r*2, an amplifier C*a*1, and a feedback resistor C*r*3 for the amplifier C*a*1. The amplifier C*a*1 effectively multiplies $-1$ times the output signal of combining means C to produce an output signal $-$A*j*. The embodiment of combining means C shown in FIG. 4 is simply an analogue adder with a specific ratio arrangement of the resistances of resistors C*r*1, C*r*2, C*r*3 of 2:1:1. That is, if the resistance of resistor C*r*1 is W, the resistance of each resistor C*r*2 nad C*r*3 is $W/2$. Since the input to resistor C*r*1 is A*j*–1, the output signal $-$A*j* then is equal to $-2Aj\text{–}1-D.Est$ where E*st* is the standard input signal to gate G2 in gating means G and where $2Aj\text{–}1=R.Aj\text{–}1$ or $R=2$. Comparator O*c* then produces a $+1$ output signal D when $-$A*j* is less than a negative reference signal, R*ef*. D is cyclically produced then as a serial digit output as indicated at the output of comparator O*c*.

Figure 5:
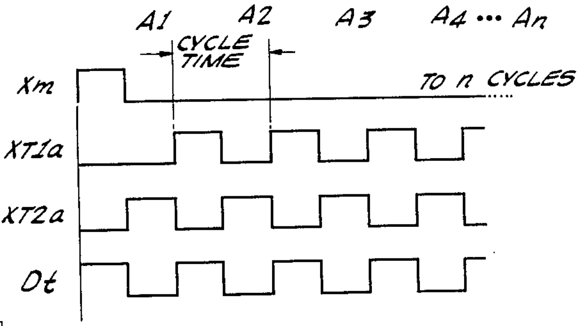
FIGS. 5 and 6 are graphs of a group of waveforms characteristic of the operation of the invention shown in FIG. 4.

The operation of the invention shown in FIG. 4 may be better understood by reference to waveforms shown in FIG. 5. X*m* is a sampling signal which occurs only once in a word time, i.e. a time during which all digits for each complete number or analogue signal are produced serially at the output of comparator O*c*, the total of which represents the magnitude of an analogue input signal. The maximum number of digits required to express the magnitude of an analogue input signal may then be represented as *n*. Gating signal X*m* simply enters an analogue signal in storage device S1. It is to be noted that transfer means T1 is closed since gating signal XT1*a* is zero during the complete first cycle operation of the converter shown in FIG. 4. Simultaneously the analogue input signals are impressed through gate M*g* on combining means C, storage device S1 simply being a parallel-connected capacitor. Trial digit D*t* is always entered during the first phase of each cycle time, each cycle having two phases as indicated by the different states of the trial digit D*t* in FIG. 5. This causes standard signal E*st* to be passed by gate G2 and thus added to 2A*j*–1, because of the ratio of the resistances of resistors C*r*. The output of combining means C is negative because of the use of amplifier C*a*1.

During the second phase of operation of the invention shown in FIG. 4, D*t* is zero and standard signal E*st* is passed to combining means C through gate G2 only if D passing through gate G1 maintains gate G2 open. X*m* is also returned to zero during the second phase of the first cycle of operation as shown in FIG. 5. This means as the analogue input signal is stored in S1, it is added to *D.Est* only if digit D is produced by comparator O*c*. It is to be noted that E*st* is negative for the analogue-to-digital converter of FIG. 4. The logical decision $D=1$ or $D=0$ is made by the comparison of $-$A*j* and $-$R*ef* to determine whether or not $-$A*j* is less than the negative referene signal input to comparator O*c*.

During the second phase of operation, the output of combining means C is passed by transfer means T2 and stored in storage device S2. This will be better understood when the configuration of the waveform of gating signal XT2*a* is examined in FIG. 5. Thus, a signal is stored in S2 which is representative of $-$A*j*. During the first phase of the second cycle of operation, this is stored in storage device S1 and simultaneously impressed upon combining means C by transfer means T2, XT1*a* then being positive or in the "1" state. $-$A*j* is converted to $+$A*j* since transfer means T1 contains an amplifier which effectively multiplies $-$A*j* by $-1$ to produce $+$A*j*, amplifier T1A being shown in FIG. 3.

Since the output voltage amplitude of storage device S2 is transferred to storage device S1 only after one cycle of operation of the device shown in FIG. 4, the signal stored in storage device S1 and simultaneously impressed upon combining means C can no longer be designated A*j* but must be designated A*j*–1. Signals at the output of combining means C are thus stored and recirculated until the voltages stored in storage devices S1 and S2, respectively, are equal to zero.

Figure 6:
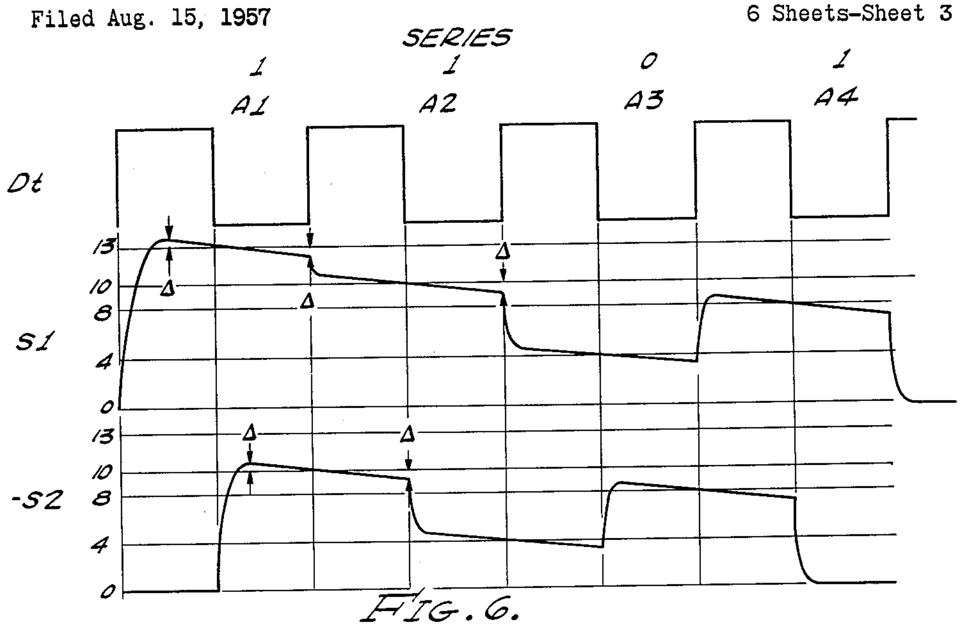

Perhaps the storage function of capacitors Sc1 and Sc2 will be better understood by reference to FIG. 6 in the drawings where the instantaneous voltage amplitude at each of these capacitors is indicated at S1 and $-$S2. Trial digit signal D*t* is also shown in FIG. 6 to indicate the cyclic storage in capacitors Sc1 and Sc2. The manner in which the number 13 is converted into serial digits at the output of comparator O*c* is also shown in FIG. 6. In the first phase of the first or A1 cycle of operation of the converter, gating storage device S1 is charged to $13+\Delta$ volts or to some voltage proportional to 13. The additional voltage of $\Delta$ is introduced in order to compensate for expected capacitor voltage decay during a cycle. During the second phase of the first or A1 cycle of operation, S1 has stored the $13+\Delta$ volts signal and decays only by the amount $\Delta$ within the second phase of the first or A1 cycle. Amplifier C*a*1 in combining means C is, therefore, provided with a gain to compensate for this and to produce an output signal equal to $$-(2.13-16+\Delta)=-(10+\Delta)=A1$$

During the second phase of operation, since $-(26)$ is smaller than $-(8)$, i.e. $-$R*ef.*, D becomes $+1$ and E*st*, $-16$ for a digit radix of 2, then is sustained by the condition $D=1$. Transfer means T2 then opens and storage device S2 is charged to a value $-(10+\Delta)$ and decays to 10 exactly at the end of the first cycle of operation.

During the first phase of the second cycle of operation, the negative value of the output signal of storage device S2 continues to decay to a magnitude of $10-\Delta$. During this time, an input signal is impressed upon combining means C and storage device S1 through transfer means T1. Storage device S1 is then driven to an amplitude of 10+Δ and decays to 10 exactly at the end of the first phase of the second cycle of operation, amplifier T1A in transfer means T1 shown in FIG. 3 having an appropriately adjusted gain to increase the amplitude of the signal stored in device S1 over that stored in device S2 to provide for the capacitor decay functions of storage device S2. As in the case of the second half of the first cycle, in the second half of the second cycle, comparator *Oc* produces an output signal to sustain the signal *D.Est* where *D*=1. Therefore, gate or transfer means T2 is opened by gating signal XT2*a* and a signal —*Aj* is stored in storage device S2 equal to 2.10—16=4. As stated previously, combining means C is designed to have a gain such that —S2 is not driven exactly to 4 but to some value 4+Δ and only falls to 4 exactly at the end of the second cycle of operation as the capacitor *Sc*1 of storage device S1 decays to a value of 10—Δ.

During the first half of the third cycle of operation, storage device S2 drives both S1 and combining means C. Again, almost immediately, storage device S1 is driven to 4+Δ decaying to 4 exactly at the middle of the third cycle. During the second half of the third cycle, however, something different happens. Specifically, the output of comparator *Oc* will be zero for the reason that —(4) is larger than —R*ef*., i.e., —(8). Thus the value appearing at the output of combining means C will be simply —2.4=—8. Thus, as S1 decays to a value of 4—Δ during the second half of the third cycle of operation, —S2 is driven to 8+Δ and decays to 8 exactly at the end of the third cycle of operation.

In the fourth and last cycle of operation, —S2 decays to 8—Δ and S1 is driven to 8+Δ and decays to 8 exactly at the middle of the fourth cycle. During the second phase of the fourth cycle, the stored value of S1 decays to 8—Δ while —S2 is driven to 0 because the output of combining means C is 0, i.e. 2.8—16=0. Since analogue input signals simply change the magnitude of the signal stored in storage device S1 and the output of combining means C, another analogue input signal can be gated into the storage device S1 and combining means C immediately after the fourth cycle of operation as shown in FIG. 6. In this case, it will be apparent that *n*=4 and the word length of all analogue input signals may be considered four cycles. From FIG. 5 it may be observed that when signal X*m* is off, signal D*t* is on, gating signal XT1 must be generated.

Figure 7:
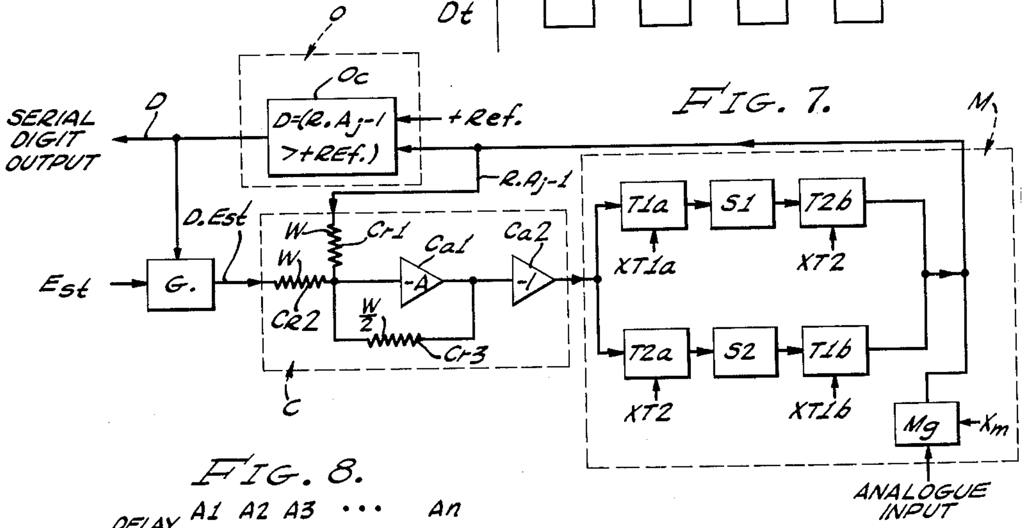
FIG. 7 is a schematic diagram of another embodiment of the invention employed to compute in accordance with the formula $RAj=R(RAj-1+D.Est)$.

In FIG. 7, an analogue-to-digital converter is shown constructed in accordance with another feature of the invention. This feature includes effectively doubling the speed of the converter shown in FIG. 4 for large word lengths, i.e. those much larger than two cycles. It is to be noted that the word length in terms of cycles for the serial connection of storage device S1 and S2 shown in FIG. 4 is equal to 2*n*. In the case of the embodiment of the invention shown in FIG. 7, which is employed to compute according to Equation 2 set out above, the total time necessary is 1+*n*. Thus as *n* becomes large in comparison to 1, the serial digit output of the converter of FIG. 7 may be operated at approximately 2 times the speed of the converter shown in FIG. 4.

In an embodiment of the invention shown in FIG. 7, gating means G takes the form simply of a gate operative in response to digit signals D to pass standard signal E*st*. The output of gating means G will then be either 0 or —E*st* depending upon whether or not *D*=0 or *D*=1. In FIG. 7, combining means C includes resistors *Cr*1 and *Cr*2 from transfer and storage means M and gating means G respectively as in FIG. 4. Combining means C is also provided with feedback resistor *Cr*3 and a polarity reversing amplifier *Ca*2 connected from the output of amplifier *Ca*1 simply to reverse the effective algebraic sign of the output of amplifier *Ca*1. Both in the case of amplifier T1*a* in transfer means T1 shown in FIG. 3 and in the case of amplifier *Ca*2 in combining means C in FIG. 7, the amplifiers may be provided with series input resistors and a feedback resistor of the same resistance to prevent any change in magnitude of their output signals but only to reverse the effective algebraic sign of their corresponding input signals. Amplifier *Ca*2 is included in combining means C because of the parallel connection of storage devices S1 and S2 shown in transfer and storage means M in FIG. 7. It is to be noted that unlike the ratio resistances of resistors *Cr*1 and *Cr*2 shown in FIG. 4, in FIG. 7 these resistances are the same and are equal to W. This means that the output signal of transfer and storage means M, i.e. *R.Aj*–1, is combined with *D.Est* with the same weight and that these are multiplied by the radix of conversion, *R*=2, where the ratio of the resistances of resistors *Cr*1 and *Cr*2 to the resistance of feedback resistor *Cr*3 is 2:1.

Figure 8:
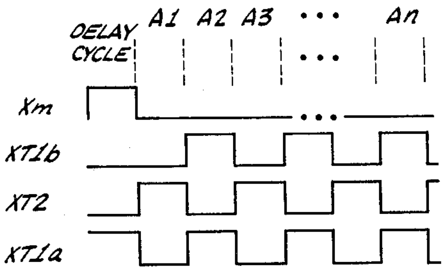
FIGS. 8 and 9 are graphs of groups of waveforms characteristic of the operation of the embodiment of the invention shown in FIG. 7.
Figure 9:
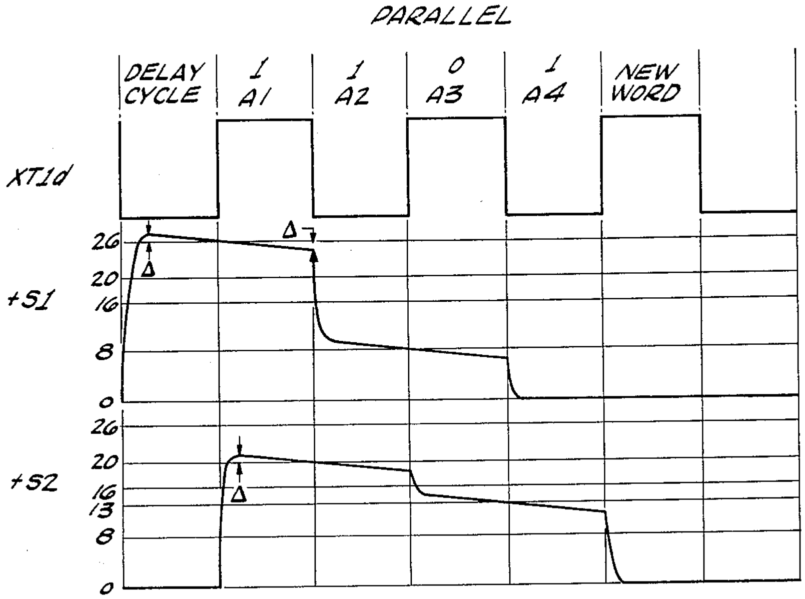

The manner ni which *R.Aj*–1 is actually developed in the first instance after an analogue input signal is sampled by gate *Mg* in transfer and storage means M will be better understood in connection with waveforms characteristic of the operation of the invention shown in FIG. 7. These waveforms are shown in FIG. 8 and FIG. 9. In FIG. 8, sampling signal X*m* is shown for passing analogue input signals through gate *Mg* both to comparator *Oc* and amplifying and combining means C. In this case a positive plus reference voltage of 16 has been chosen for an example to be explained hereinafter.

As can be seen in FIG. 8, X*m* has the same shape and occurs at the same time as in FIG. 4. XT1*b* is similar to XT1*a* shown in FIG. 5, however, the waveform of XT1*b* in FIG. 8, which is the same as XT1*a* except during the first or delay cycle in which it is zero, has its peculiar shape because it is necessary to prevent immediate storage of any input signal except at the output of amplifying and combining means C. Gating signal XT1*a* is "on" during the first or delay cycle to permit storage of *R.Aj*–1 for the next succeeding computation cycle.

It is to be noted that no gating means need be provided either immediately prior to or immediately after comparator *Oc* to prevent an output digit from occurring at the initial stage of an input signal applied to both amplifying and combining means C and comparator *Oc* to start with because the positive reference signal of comparator *Oc* will be of such a magnitude that it will be impossible for any digits *D*=1 to be generated for a particular analogue input signal.

Thus, X*m* admits an input analogue signal which is passed by transfer means T1*a*, two times the value which is passed by transfer means T1*a* to storage device S1. During this time gating signals XT1*b* and XT2 are both off to prevent any storage in device S2. In the A1, A2, A3 . . . A*n* cycles, it is to be noted that the signals XT1*a* and XT1*b* are both the same as stated previously and that XT2 alternates with XT1*a* and XT1*b* each cycle.

The signals stored in capacitors employed in storage devices S1 and S2 are shown in FIG. 9. Signal XT1*b* is shown in FIG. 9 for purposes of reference. The number chosen as representative of the input analogue amplitude is again 13 represented in binary numbers as 1101.

In the first cycle of the operation shown in FIG. 9, a value twice the amplitude of the analogue input signal is simply entered in storage device S1 by multiplying by *R*=2 in amplifying and combining means C. Again as in the case of the series connections of storage devices S1 and S2, the amplifier *Cra* is designed to have a gain such as storage device S2 as being driven in the A1 cycle shown in FIG. 9, it will fall as the voltage of *Sc*1 falls, but will be driven to a value such that it will arrive approximately at the number 20 at the end of the A1 cycle. It is to be noted that in the A1 cycle a *D*=1 digit is thus obtained because comparison of number 26 with the reference 16 as *D*=(*R.Aj*–1>+*Ref*.) produces a *D*=1 where *R.Aj*–1=26 and +*Ref*.=16. Similarly, in the A2 cycle 20 exceeds 16 hence another digit *D*=1 is produced. However, in the A3 cycle, 8 is compared with 16 and is found to be smaller in which case $D=0$. However, in the last case 8 is again multiplied by 2 to arrive at 16 which is equal to the reference for digit output of $D=1$.

It is to be noted that except for $n=1$, which will obviously never be the case, the embodiment of the invention as shown in FIG. 7 always operates faster than that shown in FIG. 4. It should be noted further that storage is required for the first delay cycle of the operation of the invention shown in FIG. 7. This is required for fast computation in accordance with the formula of Equation 2. Another means for storing this information rather than in transfer and storage means M is shown in FIG. 10 wherein such storage means includes a flip-flop O*f* in output and comparison means O.

Figures 10, 11, 12:
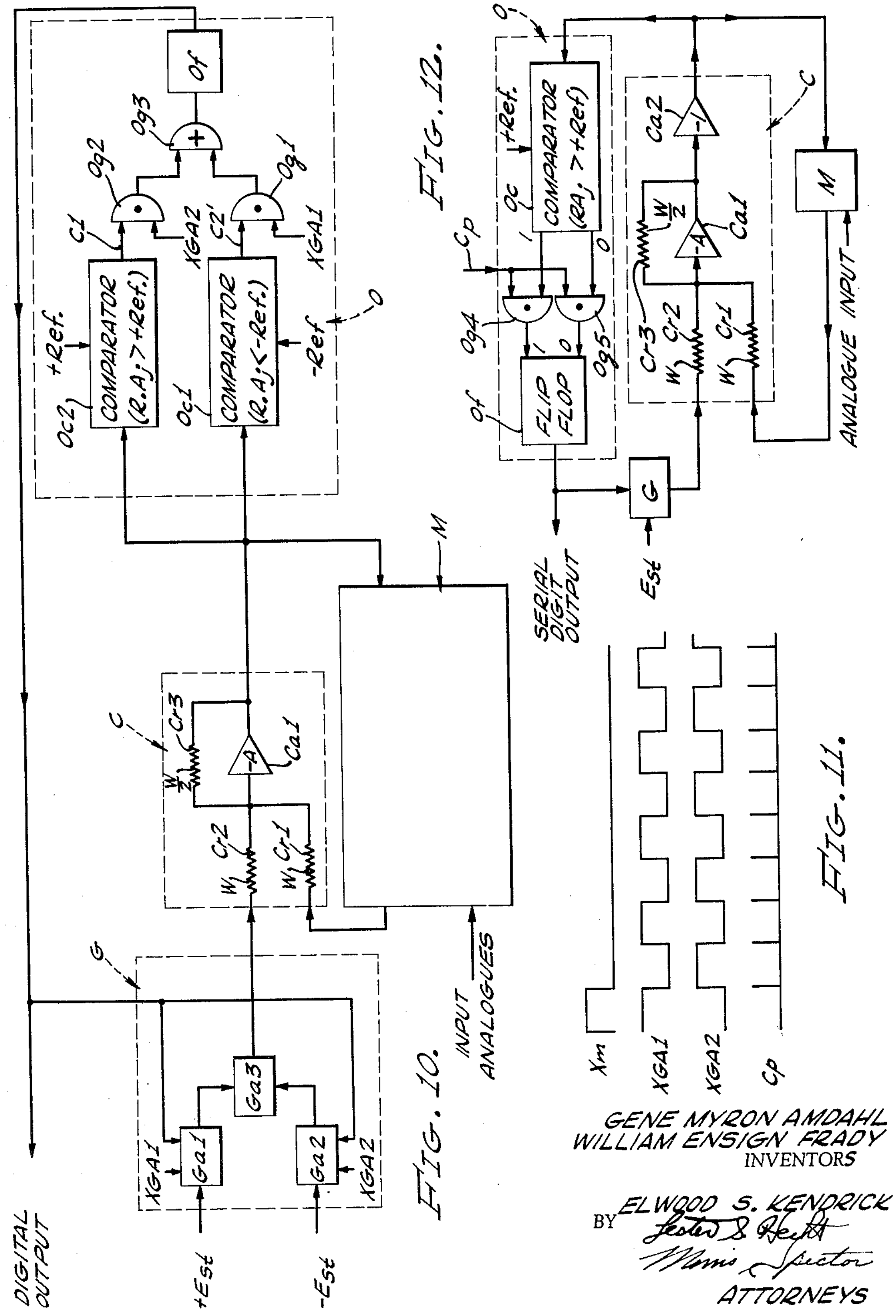
FIG. 10 is a schematic diagram of still another embodiment of the invention incorporating standard signals of different polarities.
FIG. 11 is a graph of a group of waveforms characteristic of the operation of the embodiment of the invention shown in FIG. 10.
FIG. 12 is a schematic diagram of a converter constructed in accordance with several of the features of the invention shown in FIG. 10.

An arrangement is shown in FIG.10 for computing according to the fast formula of Equation 2 but without the use of the additional amplifier C*a*2 in combining means C. Combining means C otherwise will be exactly the same as combining means C shown in FIG. 7. Transfer and storage means M may also be identical to that embodiment shown in FIG. 7. Gating means G takes the form of two input gates G*a*1 and G*a*2 responsive to a digit output signal D of a flip-flop O*f* for passing positive and negative standard signals +E*st* and —E*st*, alternately through a logical "or" gate. This is impressed upon combining means C with the output of transfer and storage means M.

The output of combining means C is impressed upon transfer and storage means M and output and comparison means O. The reason that it is necessary to use both positive and negative standard signals is that no amplifier C*a*2 is employed in combining means C. Alternately a positive and a negative standard signal must be added to the output of transfer and storage means M in combining circuits C. Still further, different comparators must be employed to determine whether or not a digit signal D should be applied to gates G*a*1 and G*a*2 in gating means G. Alternatively, different reference signals may be gated into the same comparator. Two comparators, however, are indicated at O*c*1 and O*c*2 in output and comparison means O. Comparator O*c*2 compares whether or not the output signal *R.Aj* of combining means C is larger than a positive reference signal and comparator O*c*1 produces a positive or "true" output signal when the output signal *R.Aj* of combining means C is less than a negative reference signal. Hence comparator O*c*2 is employed to compare the magnitudes of positive output singals of combining means C, and comparator O*c*1, negative output signals.

It is to be noted that in computation in accordance with the fast formula of Equation 2, it is necessary to provide digit storage. For this reason, logical "and" gates O*g*1 and O*g*2 are provided at the outputs, respectively, of comparators O*c*1 and O*c*2 to set flip-flop O*f* through a logical "or" gate O*g*3 on the occurrence of gating signals XG*a*1 and XG*a*2, respectively.

A substantially identical arrangement is shown in FIG. 12 where gating means G may include simply a gate to provide an output signal *D.Est* whenever the output of flip-flop O*f* is "true." However, use of the logical "or" gate O*g*3 may be eliminated and flip-flop O*f* set simply in accordance with the output of comparator O*c*. The output will either be high or low and a clock pulse C*p* may be employed with "and" gates O*g*4 and O*g*5 to set flip-flop O*f* in corresponding states.

Waveforms characteristic of the operation of both the analogue-to-digital converters shown in FIGS. 10 and 12 are shown in FIG. 11 including analogue input gating signal X*m*, standard gating signals XG*a*, and a clock pulse C*p* which is applied to gates O*g*4 and O*g*5 and output and comparison means O in FIG. 12. As is well known in the art, comparators O*c* may take the form of Schmitt Trigger Circuits.

Figure 14:
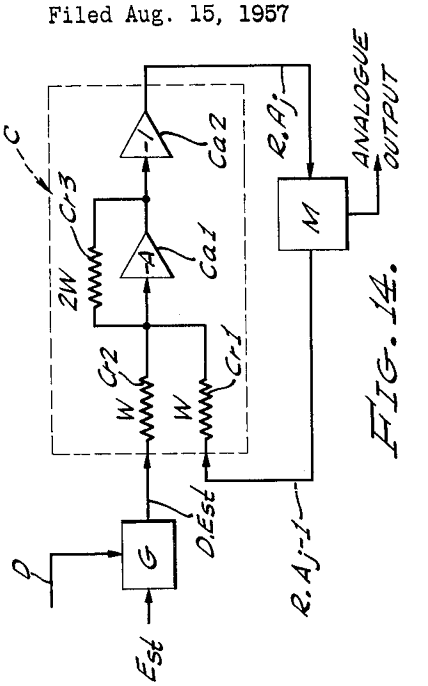
FIGS. 13 and 14 are schematic diagrams of digital-to-analogue converters constructed in accordance with the invention.
Figure 13:
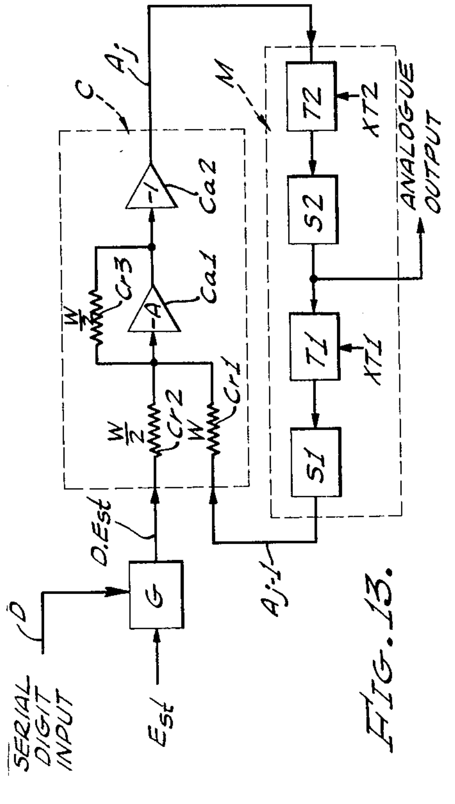

FIGS. 13 and 14 are schematic diagrams of digital-to-analogue converters utilizing slow and fast conversions, respectively. Hence the embodiment shown in FIG. 14 must include parallel storage devices. Either parallel or serial storage devices may be employed in the embodiment shown in FIG. 13, although a serial connection is specifically shown. FIG. 13 shows a ratio of resistance of resistors C*r* for producing output signals corresponding to a radix of conversion equal to +2 so that the usual descending order of significance is employed in the serial digit input to gating means G.

In FIG. 14, a binary ascending order of digit significance is observed as digits are serially fed to gating means G. Hence, in this case the radix of conversion, R, provided by combining means C is equal to +½. This could be made —½ by avoiding the use of the amplifier C*a*2 which reverses the polarity of output signals of amplifier C*a*1. It is to be noted that combining means C of both FIGS. 13 and 14 are identical except for the ratio of resistances of resistors C*r* in each particular case. It will be obvious that for FIGS. 4 and 10 combining means C is employed to produce an output signal —A*j* where $R=-2$.

Figure 15:
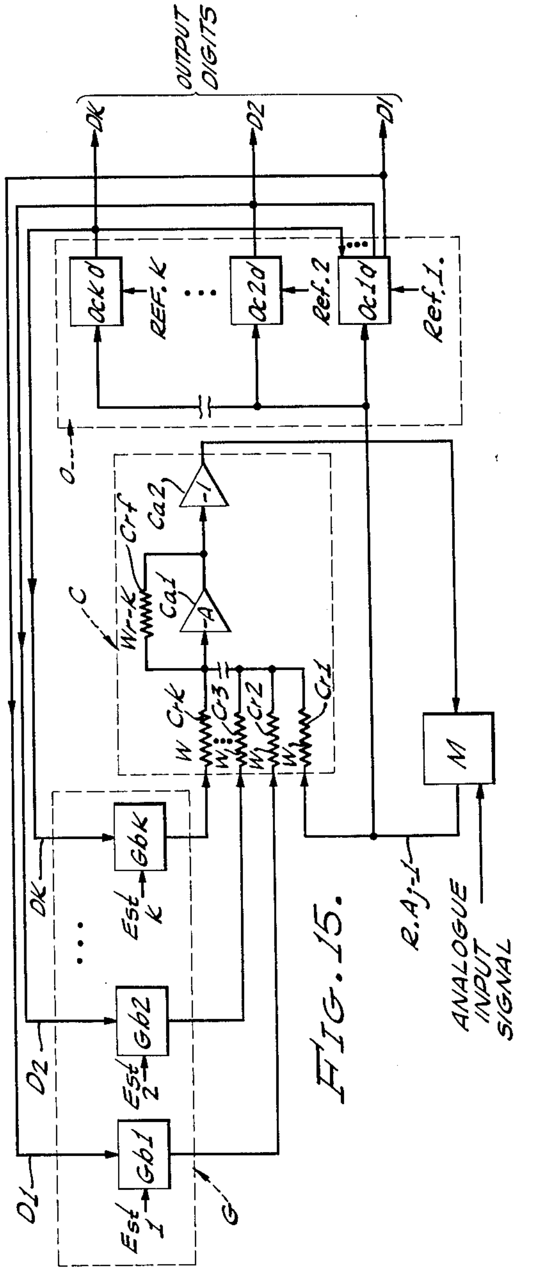
FIGS. 15 and 16 are schematic diagrams of still other alternative embodiments of the invention for producing several digits at a time in an analogue-to-digital converter.

The embodiment of the invention shown in FIG. 15 may be employed to produce a number of output digits *k* of words having a number of digits *n* where *n*/*k* is equal to an integer. In this case gating means G includes gates G*b*1, G*b*2 . . . G*bk* corresponding to each of digits D1, D2 . . . D*k* to be produced at a time. Combining means C is then provided with a corresponding number of resistors C*r*1, C*r*2 . . . C*rk* corresponding to the number of digits to be produced at a time. A feedback resistor C*rf* is also provided, combining means C also including amplifiers C*a*1 and C*a*2 connected as before. As shown, combining means C is designed to produce output signals R.A*j* in accordance with the formula of Equation 2 for the fast mode of operation. For this reason, resistance of resistor C*rf* should be $Wr^{-k}$ where W is an arbitrary constant, *r* is the radix of the digits D, and *k* is the number of digits produced at one time.

Figure 16:
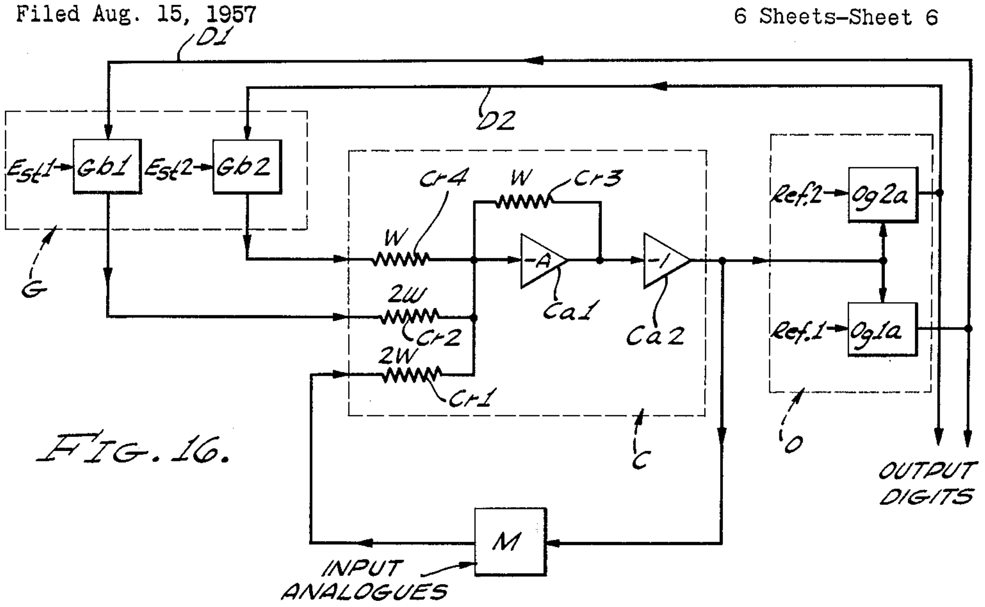

Still another alternative embodiment of combining means C is shown in FIG. 16 where standard signals E*st*1, E*st*2 . . . E*stk* that are introduced to gates G*b*1, G*b*2 . . . G*bk* in gating means G are constant and the resistances of resistors C*r*1, C*r*2 . . . C*rk* are varied, *k* being only equal to 2. If the mode of operation is slow in accordance with Equation 1 with the embodiment shown in FIG. 15, the resistance of resistor C*r*1 should be W whereas the resistances of C*r*2, C*r*3 . . . C*rk* all should be W/2 where standard signals E*st*1, E*st*2 . . . E*stk* vary as $r^0, r^1, r^2 \ldots r^{k-1}$. The resistances of all resistors shown in combining means C in FIG. 15 are equal except resistance of feedback resistor C*rf*. Two conditions are required for this embodiment of the invention. Firstly, single-phase computation must be made in accordance with the formula of Equation 2. Secondly, standard signal E*st*1 must be equal to $Wr^0$, E*st*2 equal to $Wr^2$ . . . E*stk* equal to $Wr^{k-1}$, etc. If standard signals E*st* are all equal, the resistances of resistors C*r*2, C*r*3 . . . C*rk* must vary as $$\frac{Wr}{2} \text{ to } \frac{Wr^1}{2} \cdots \frac{Wr^{k-1}}{2}$$

for two-phase operation in accordance with a computation of Equation 1. Output and combining means O includes a plurality of comparators O*c*1*a*, O*c*2*a* . . . O*cka* corresponding respectively to digits D1, D2 . . . D*k*. The output digits preferably have different amplitudes that do not correspond to binary functions of simply 0 and 1. These are as follows:

$$\left.\begin{array}{l} D1=r^0 \\ D2=r^1 \\ D3=r^2 \\ \cdot \\ \cdot \\ \cdot \\ Dk=r^{k-1} \end{array}\right\} \quad (3)$$

The magnitudes of digit signals D thus vary. However, the higher valued ones may, of course, be attenuated, if desired, at the digit output of each comparator *Oc1a*, *Oc2a* . . . *Ocka* to make them all equal in amplitude.

Based on Equations 3, digits D are produced by comparators *Oc1a*, *Oc2a* . . . *Ocka* according to the following logical equations:

$$D1=[R.Aj\text{-}1-(D2+D3\ .\ .\ .\ +Dk)>r^0]$$
$$D2=[R.Aj\text{-}1-(D3+D4\ .\ .\ .\ +Dk)>r^1]$$
$$\vdots$$
$$Dk=(R.Aj\text{-}1>r^{k-1})$$

The embodiment of the invention shown in FIG. 16 differs from the embodiment shown in FIG. 15 in that $k=2$. Furthermore, as stated previously, combining means C is designed to compute according to Equation 1. However, it is to be noted that combining means C in FIG. 16 is also designed to compute with a radix of conversion $R=\frac{1}{2}$. Furthermore, standard signal *Est1* is considered equal to the standard signal *Est2* and the ratio of resistances of resistors *Cr1*, *Cr2*, *Cr3*, and *Cr4* is as follows: 2:2:1:1. Combining means C in FIG. 16 includes the conventional amplifiers *Ca1* and *Ca2* to provide a positive output signal $+Aj$. The magnitude of the resistances of resistors *Cr2* and *Cr4* are chosen especially to produce combined signals in a descending order of significance corresponding to the binary radix of $r=2$. Output of combining means C is impressed upon transfer and storage means M and upon output and comparison means O. Means O includes two comparators *Og1a* and *Og2a* respectively corresponding to gates *Gb1* and *Gb2*. Comparators *Og1a* and *Og2a* are provided with separate input signals *Ref1* and *Ref2*, the first of which must be ½ the amplitude of the second if both the comparators *Og1a* and *Og2a* are biased to the same potential.

Figure 17:
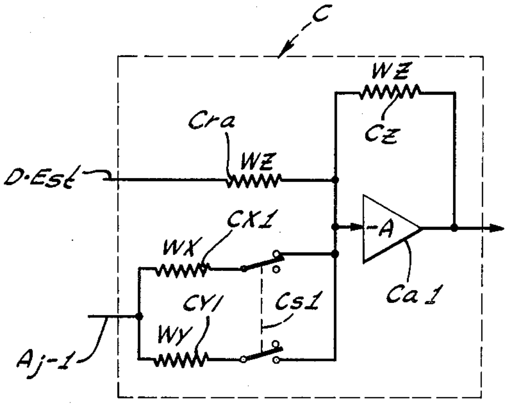
FIGS. 17 and 18 are schematic diagrams of alternative means for combining signals A*j*–1 or *R.Aj* with the signal *D.Est*.
Figure 18:
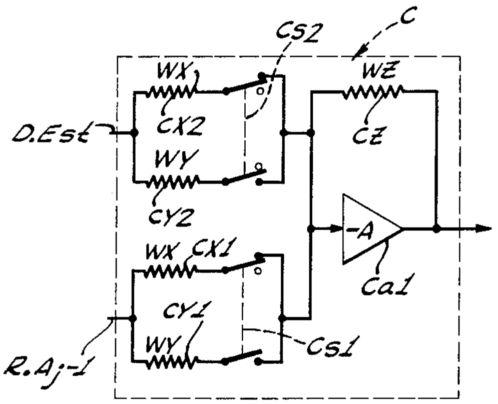

FIGS. 17 and 18 are schematic diagrams of alternative embodiments of the combining means C. The embodiment of FIG. 17 may be employed if a three-phase cycle of operation is desired. Combining means C in FIG. 17 has a three-phase mode of operation because computation is made according to the formula of Equation 1. Combining means C shown in FIG. 18 has a two-phase mode of operation because computation is made according to the formula of Equation 2. In each of FIGS. 17 and 18 either or both the *Aj*–1 or *R.Aj*–1 inputs and the *D.Est* input are impressed upon combining means C through a pair of resistors CX1 and CY1 or a pair of resistors CX2 and CY2. In FIG. 17, only a single resistor *Cra* is provided for the *D.Est* input and a feedback resistor CZ as provided for amplifier *Ca1*. In FIG. 18, a pair of resistors CX2 and CY2 are provided for the *D.Est* input and a feedback resistor CZ as provided for amplifier *Ca1*. In each case, the *Aj*–1 input or the *R.Aj*–1 input is impressed on amplifier *Ca1* through resistors CX1 and CY1.

In each of the FIGS. 17 and 18, a double-pole, double-throw switch *Cs1* is provided to introduce signals *Aj*–1 or *R.Aj*–1 through a particular resistor CX1 or CY1 to amplifier *Ca1*. In FIG. 18, a double-pole, double-throw switch *Cs2* is employed to introduce signal *D.Est* to one of the resistors CX2 or CY2 to the input of amplifier *Ca1* simultaneously. It is to be noted that in order to make the mode of operation of comparator means C in FIG. 17 four phase, simply another resistor and switch would have to be added to the system of X, Y, etc. In order to make the combining means C in FIG. 18 three phase, the same thing would be applicable to both sets of resistors CX and CY. Similarly, either one of the embodiments of the combining means C shown in either of the FIGS. 17 and 18 may be modified to operate according to a 5, 6, 7, etc., phase mode of operation. In each of FIGS. 17 and 18, WX, WY, and WZ are employed to indicate the resistance of corresponding resistors CX, CY, and CZ.

In the operation of combining means C shown in FIG. 17, signal *Aj*–1 is introduced to amplifier *Ca1* first through resistor CX1 and subsequently through resistor CY1. In this case, signal *D.Est* is supplied to amplifier *Ca1* through resistor *Cra* only during one of these cycles. Similarly, *R.Aj*–1 is introduced to amplifier *Ca1* through corresponding resistors CX1 and CY1 as signal *D.Est* is introduced simultaneously to resistors CX2 and CY2. In all cases in both the embodiments of the invention shown in FIGS. 17 and 18, the constants $$\frac{WY}{Z^2}$$

must be equal to R. In the general case $$\frac{L_1\cdot L_2\ .\ .\ .\ L_i}{Z^2}$$

must be equal to R where $L_1=X$, $L_2=Y$, etc., the number of phases per cycle for fast operation according to Equation 2 is $i$ and the number of phases per cycle for slow operation according to Equation 1 is $1+i$.

Summarizing, it will thus be apparent that any embodiment of the invention may be employed simply by an alternative switching arrangement as an analogue-to-digital converter or digital-to-analogue converter. The only modification necessary in going from a digital-to-analogue converter or to an analogue-to-digital converter, of course, will be the connection of output comparison means O to combining means C via, for example, switch *Ad2* shown in FIG. 1. It is to be noted that computation in either an analogue-to-digital converter or a digital-to-analogue converter may be performed in accordance with Equation 1 or Equation 2. It is to be noted that in order to compute in accordance with Equation 2, some storage must be provided. However, this may be provided in amplitude storage means S itself. Alternatively this may be included in output and comparison means O. Of course, neither of these is necessary where digital-to-analogue conversion is made and is only necessary where analogue-to-digital conversion is made.

Still further, computation according to either equation in connection with either a "less than" or a "greater than" comparator may be single phase, two phase, three phase, four phase, etc. Still further, R may be equal to $\pm r$ or $\pm 1/r$. R must always be equal to $\pm r$ or to some power $\pm r^k$ thereof for analogue-to-digital conversions because this radix of conversion is for conversions in the descending order of digit significance. However, R may be equal to $\pm r$ or $\pm 1/r$ for digital-to-analogue conversions.

Gating means G may take any one of the number of forms as shown throughout the drawings. It, in fact, may be considered a digital-to-analogue converter in itself. This will depend upon the particular embodiments selected. For example, if computation according to Equation 1 is made, gates G1 and G2 must be provided as shown in FIG. 4 to combine trial digit *Dt* with output digits D of comparator *Oc*. In the second place, in this same figure it is to be noted that where R is negative, transfer means T1 must be provided with an amplifier T1A as shown in FIG. 3 or that an arrangement similar to the arrangement of FIG. 10 must be provided where gating means G includes gates *Ga*, *Est* being introduced with gating signals *XGa* and thereby being alternately positive and negative. In this case, of course, output and comparison means O must include two comparators *Oc1* and *Oc2*. In the third case for gating means G, it must include a plurality of gates *Gb1*, *Gb2* . . . *Gbk* to correspond to a number of digits $k$ to be produced serially at one time, such as is shown in FIG. 15.

Combining means C may take any one of several forms depending upon what mode of operation is desired. Specifically it may have one amplifier *Ca1* or two amplifiers *Ca1* and *Ca2* depending upon whether or not R is positive or negative. The number of input resistors $Cr1$, $Cr2$ . . . $Crk$ will depend upon whether or not the embodiment of the invention shown in FIG. 15 is used or whether one digit at a time is produced or whether the number of phases of operation is increased such as by the use of more resistors CX and CY in the different embodiments shown in FIGS. 17 and 18. The magnitude of the input in feedback resistors in the combining circuit will also depend upon whether or not computation is made in accordance with Equation 1 or Equation 2. The magnitude of the resistances of all resistors will be dependent upon whether the radix of conversion R is equal to $\pm r$ or $\pm 1/r$. Still further, the magnitudes of the resistances of input resistors $Cr$ will depend upon whether or not the output of transfer and storage means M is a single output or a multiple output as indicated in FIG. 15. Still further, they will depend upon whether standard signals $Est1$, $Est2$ . . . $Estk$ have amplitudes corresponding to $r^0, r^1 \ldots r^{k-1}$ or are all equal to each other.

Amplitude storage means S may also employ capacitor storage or other convenient storage means. In all cases there must be two storage means in order to prevent undesirable feedback instability in the converter of the invention as explained previously in connection with the Fletcher article. It is to be noted that the parallel arrangement of storage devices S1 and S2 shown in FIG. 2 may be employed with any embodiment of the invention. The series arrangements shown in FIG. 3 may be employed only in the embodiment constructed to operate according to the two-phase mode of operation computed in accordance with Equation 1.

Output and comparison means O may take any one of several forms. It may be considered an analogue-to-digital converter in itself. It, of course, must be provided with storage means preferably the type shown in FIG. 10 if computation is made according to Equation 2 and if storage in amplitude storage means S is not relied upon. Depending upon whether or not R is positive or negative, comparators also should be provided for analogue-to-digital conversion in output and comparison means O either to produce digit signal D when the input signal is larger than a predetermined reference signal or when it is smaller than a predetermined reference signal, the reference signal being arbitrarily chosen either positive or negative depending upon whether or not combining means C produces output signals $Aj$ or $R.Aj$ that are positive or negative. There will be one or two comparators depending upon whether R is negative in the solution of using two standard signals, i.e. a positive and negative standard signal $Est$ as shown in FIG. 10 or whether an amplifier is included in transfer means T1 as shown in FIG. 3. Still further, whether or not one or two comparators $Oc$ or $Og$ are provided in output and comparison means O will depend upon whether or not one or more than one digit at a time will be produced serially at the output of comparison means 0, a plurality of digits D1, D2 . . . $Dk$ being shown in FIG. 15.

Although several specific embodiments of the invention have been shown and described, it is to be understood that the invention is by no means limited to these specific embodiments or to only the specific embodiments shown. On the contrary, as stated above and as will be obvious to those skilled in the art, many of the variables in the construction of the invention may be changed without departing from the true scope of the invention as defined in the appended claims.

What is claimed is:

1. An output converting device comprising: first means for receiving a predetermined constant standard signal and a digital control signal and for producing a first output signal representing an effective logical product of its received signals; second means adapted to store applied input signals while simultaneously producing a second output signal corresponding to a previously stored input signal; third means for combining said first and second output signals to produce a third output signal having an analogue value equal to the combination of said first and second output signals modified in accordance with a predetermined radix of conversion; fourth means for transferring each third output signal, as it is formed, to said second means for storage and for transferring each previously stored second output signal from said second means to constitute an input for said third means; fifth means responsive to each third output signal and to an applied reference signal for producing an output digit signal indicating a comparison between the analogue values of the applied input signal; and sixth means for applying each output digit signal to said first means to constitute said digital control signal therefor.

2. An analogue-to-digital converter comprising: first means for generating a digit product signal $D.Est$, where D is a digit control signal corresponding to the arithmetic weight in a particular digital place, and $Est$ is a standard signal, said first means including a group of circuits for producing signals $D1.Est1+\ldots Dk.Estk$, respectively, representing a series of digit products, the sum of which constitutes said digit product signal $D.Est$; second means responsive to signal $D.Est$ and to an applied input signal $Aj\text{–}1$ for producing an analogue signal $Aj$ defined by the function $Aj=Aj\text{–}1.R+D.Est$, where R represents a predetermined radix of conversion and $Aj\text{–}1$ a previously formed analogue signal; third means for storing each signal $Aj$ as it is formed and for applying the previously formed signal $Aj\text{–}1$ to said second means; fourth means for producing digital control signals D1 . . . $Dk$, representing said digit D, said fourth means including a comparison circuit for generating each signal D1 . . . $Dk$, each comparison circuit receiving a signal proportional to each signal $Aj$ at one input circuit and a reference signal applied to the other input circuit, determined as a function of the value of the particular digit D1 . . . $Dk$; and fifth means for applying signals D1 . . . $Dk$ to the corresponding circuits in said first means.

3. The analogue-to-digital converter defined in claim 2 wherein said first means includes first and second circuits, the second of said circuits receiving a standard signal twice the value of that applied to the first circuit to represent a digital product of two times the weight thereof; and wherein two comparators are included in said fourth means responsive to first and second reference signals, respectively.

4. A system for translating an analogue input signal into a series of binary output signals representing the amplitude thereof, said system comprising: first means for receiving digit signals D1 and D2 having weights of one and two, respectively, and for producing product signals $D1.Est$ and $D2.Est$, respectively, where $Est$ is a predetermined standard signal; second means for combining said product signals to form a complete digit product signal D representing the analogue equivalent of a digital weight in a particular binary place; third means for receiving said complete digit product signal and an applied analogue signal for cyclically producing successive analogue output signals by multiplying the amplitude of the applied signals by an amount proportional to a radix of conversion; fourth means for receiving and storing each successive analogue output signal as it is formed, while simultaneously applying the previously formed analogue output signal to said third means; and fifth means responsive to each analogue signal for comparing each analogue signal to first and second binary reference signals $Ref1$ and $Ref2$, said fifth means producing said digit signals D1 and D2.

5. The system defined in claim 4 wherein said fifth means includes storage means for retaining said digit signals during the period of formation of the next analogue output signal.

6. The system defined in claim 4 wherein said fifth means includes a plurality of comparator circuits for simultaneously comparing each analogue output signal with said first and second reference signals to simultaneously generate said digit signals applied to said first means.

7. An analogue-to-digital converter system comprising: first and second storage devices S1 and S2; first and second transfer means T1 and T2 for transferring signals to and from said storage devices S1 and S2, respectively; means responsive to an applied standard signal E*st* and a digital control signal D for producing an analogue signal A*j* in accordance with the function $Aj=R.Aj-1+D.Est$, where R represents a predetermined radix of conversion, and A*j*–1 the previously formed analogue signal, said means including a first circuit for generating the product *D.Est*, a second circuit for combining signal *D.Est* with the previously formed signal A*j*–1, and a third circuit for introducing the radix conversion factor R; a comparator circuit having first and second input terminals, said first terminal being coupled to said third circuit and said second terminal receiving a predetermined reference signal, said comparator circuit producing an output signal indicating the sense of the comparison between each analogue signal produced by said third circuit and the applied reference signal; and a storage device for retaining each output signal of said comparator to constitute the digital control signal for said first circuit during the formation of the next analogue output signal A*j*.

8. An analogue-to-digital converter comprising: first means responsive to a digit signal D, and to an applied standard signal, *Est*, for generating a product signal, *D.Est*, having an amplitude corresponding to the product of the digit signal times the standard signal; second means responsive to said product signal and to input signals, for cyclically producing an output signal $$R.Aj=R.(R.Aj-1+D.Est)$$

where *R.Aj*–1 represents an output signal of said second means produced in a cycle of operation immediately prior to a cycle during which said *R.Aj* signal is produced, and R is a constant radix of conversion; third means for applying said *R.Aj*–1 signal as an input signal to said second means during a cycle of operation of said second means immediately following that cycle during which said *R.Aj*–1 signal was produced; and fourth means responsive to said *R.Aj*–1 signal for comparing it to a predetermined reference signal to produce said digit signal and to impress said digit signal on said first means.

9. In a conversion system, a combination for cyclically producing a succession of analogue signals A*j* in accordance with a predetermined radix of conversion, said combination comprising: first and second storage elements S1 and S2; a gating circuit G for producing an output signal *D.Est*, where D represents an applied digit signal and E*st* represents a standard signal, said gating circuit G including means for applying a test digit D*t* to control the gating of said standard signal E*st*; a combining circuit C for producing successive analogue output signals in accordance with the function $Aj=R.Aj-1+D.Est$, where R is a predetermined radix of conversion, and A*j*–1 represents a previously stored signal A*j*; a first transfer circuit for coupling storage element S1 to said combining circuit while coupling the output of said combining circuit to storage element S2; a second transfer circuit for coupling storage element S2 to said combining circuit while coupling the output of said combining circuit to storage element S1; and means O for comparing the function $R.Aj-1+D.Est$ to an applied reference signal R*ef* during a first phase of operation to produce said digit signal D during a second phase of operation, in accordance with the result of the first phase.

References Cited in the file of this patent

UNITED STATES PATENTS

| | | |
|---|---|---|
| 2,736,889 | Kaiser et al. | Feb. 28, 1956 |
| 2,754,503 | Forbes | July 10, 1956 |
| 2,784,907 | Williams | Mar. 12, 1957 |
| 2,817,704 | Huntley | Dec. 24, 1957 |
| 2,824,285 | Hunt | Feb. 18, 1958 |
| 2,865,564 | Kaiser et al. | Dec. 23, 1958 |

UNITED STATES PATENT OFFICE

CERTIFICATE OF CORRECTION

Patent No. 3,049,701 August 14, 1962

Gene Myron Amdahl et al.

It is hereby certified that error appears in the above numbered patent requiring correction and that the said Letters Patent should read as corrected below.

Column 5, line 48, for "R.Aj" read -- R.Aj-1 --; column 6, line 22, for "storge" read -- storage --; column 7, line 69, after "digit" insert -- product --; column 9, line 53, for "nad" read -- and --; column 12, line 18, for "ni" read -- in --; line 30, for "FIG. 4" read -- FIG. 5 --; column 13, line 48, for "singals" read -- signals --.

Signed and sealed this 21st day of April 1964.

(SEAL)
Attest:

ERNEST W. SWIDER
Attesting Officer

EDWARD J. BRENNER
Commissioner of Patents